J. H. WALKER.

Machines for Pricking Leather.

No. 5,803. Reissued March 24, 1874.

Witnesses
Dan. Scott
Geo. Sands

J. H. Walker Inventor.
by F. G. Arnold
Atty.

AM. PHOTO-LITHOGRAPHIC CO. N. Y. (OSBORNE'S PROCESS.)

UNITED STATES PATENT OFFICE.

J. H. WALKER, OF WORCESTER, MASSACHUSETTS.

IMPROVEMENT IN MACHINES FOR PRICKING LEATHER.

Specification forming part of Letters Patent No. 34,537, dated February 25, 1862; reissue No. 5,803, dated March 24, 1874; application filed February 26, 1874.

*To all whom it may concern:*

Be it known that I, J. H. WALKER, of the city and county of Worcester, State of Massachusetts, have invented certain Improvements in a Machine for Pricking Leather, of which the following is a specification:

My invention is designed to prick the holes for the seams of boot-legs, to be afterward sewed up by hand, enabling the seams to be sewed much faster, and insuring a true, even row of stitches corresponding to any form or pattern desired. It consists in arranging a series of pricking-points or awls (sufficient in number for all the stitches desired) in a carrier or slide, by means of which they may be jointly moved, and connecting therewith a perforated plate or table through which the awls pass before entering the leather, and into which they may be withdrawn sufficiently to release them from the leather, and a platen or point-receiver having a series of holes corresponding to the awls, and into which they enter after passing through the leather, and also in a peculiar arrangement and combination of levers and their connections with the above, and the necessary frame-work and table or stand, whereby the machine is made capable of being operated quickly and conveniently by one person.

The accompanying drawings represent a machine embodying my invention.

Figure 1:
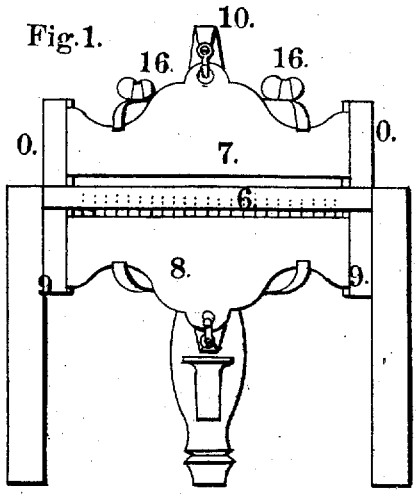
Figure 3:
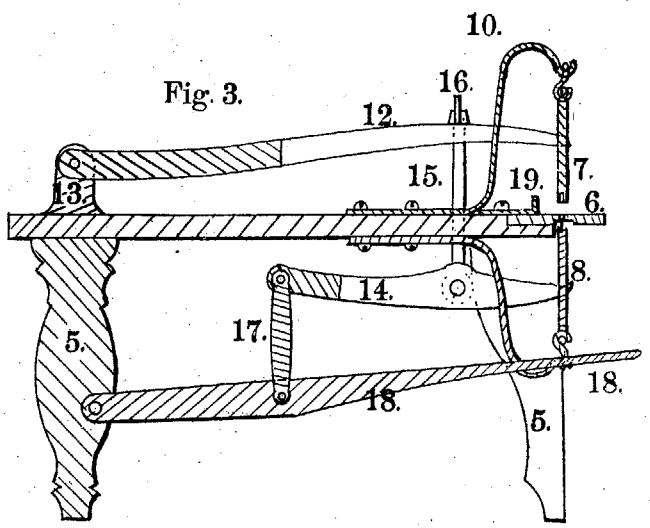
Figure 2:
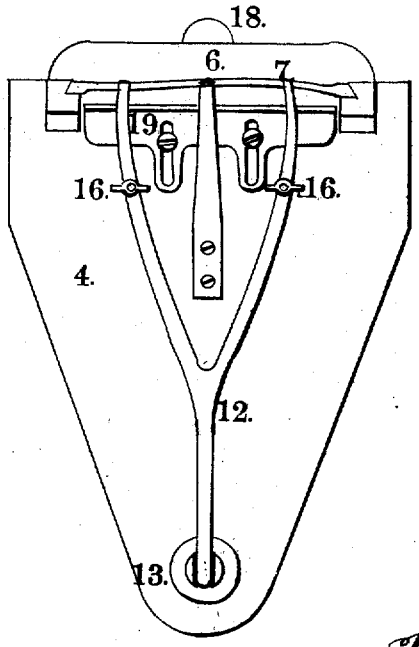

Figure 1 is a front view. Fig. 2 is a view from above. Fig. 3 is a central vertical section from front to rear.

The bed or table marked 4 in the drawing is supported on the legs 5, and to it is attached the perforated plate 6, which has a series of holes corresponding to the awls in the awl-carrier 8, in which the awls are set the proper distance apart, and on a curved line corresponding to the pattern or form of the boot, and which slides in the ways 9. 7 is the point-receiver or platen, having holes in its surface facing the awls, into which the awls enter, and moving in slides or ways 0. 10 is a spring, supported by the table, and connected to the point-receiver 7, and the carrier 8 is provided with a similar one. 12 is a forked lever having its rear end pivoted at 13 and its forked ends resting against the point-receiver 7 to operate it; and 14 is another forked lever whose forked end rests against the carrier 8, and has two rods, 15, pivoted to it and connecting it to the lever 12, and having adjusting-nuts 16 on their ends. 17 is a connection from the rear end of lever 14 to the foot-lever 18, which is pivoted to the leg 5, as seen in Fig. 3. 19 is a gage back of the holes in plate 6, and is adjustable by its slats and screws to and from the holes or awls.

It will be seen in Fig. 2 that the point-receiver 7 is of a curved form, to correspond to the awls, which are set on the curve of the edge of the back or pattern of the boot to give the proper seam.

In operation, the gage 19 is set the distance from the awls that it is desired to make the holes from the edge, and the leather is put on 6 and against the gage, and the foot-lever 18 is depressed, bringing with it the rear end of lever 14, which, by its rods 15, brings the platen 7 against the leather, and, at the same time, forces the carrier 8 and awls against the other side and through the leather into the holes in the platen, pricking the leather. On releasing the lever 18 the springs separate the carrier 8 and point-receiver 7, returning the latter to place, and withdrawing the former and its awls back through or into the holes in plate 6, which strips or releases the leather from them, the whole operation being readily performed by one operator.

I claim—

1. In a leather-pricking machine, the combination of the awl-carrier 8, having a series of awls set in a curved line, and a point-receiver, 7, having holes corresponding to the awls, and into which they enter in operation, as set forth.

2. The combination, in a leather-pricking machine, of the awl-carrier 8 having a series of awls set in a curved line, corresponding point-receiver 7, and perforated plate or stripper 6, which releases the leather from the awls, substantially as described.

3. The combination, in a leather-pricking machine, of the carrier 8, point-receiver 7, and the forked levers 12 and 14, springs 10, rods 15, and foot-lever 18, to operate them in the manner and for the purpose above set forth.

4. The combination, in a leather-pricking machine, of a perforated plate with an awl-carrier having a series of awls set in a curved line, and corresponding point-receiver or platen, with the mechanism to move the carrier and platen toward and from each other, so that leather placed between shall be pricked as desired, and the awls released therefrom, substantially as described.

Witness my hand this 24th day of February, A. D. 1874.

J. H. WALKER.

Witnesses:
F. T. BLOEKMER,
DAVID MANNING, Jr.